(12) United States Patent
Theobald (10) Patent No.: US 8,463,724 B2
(45) Date of Patent: Jun. 11, 2013

(54) COMPUTER ARCHIVE TRAVERSAL

(75) Inventor: Dietmar Theobald, Karlsruhe (DE)

(73) Assignee: SAP AG, Walldorf (DE)

( * ) Notice: Subject to any disclaimer, the term of this patent is extended or adjusted under 35 U.S.C. 154(b) by 1026 days.

(21) Appl. No.: 12/184,896

(22) Filed: Aug. 1, 2008

(65) Prior Publication Data

US 2009/0037357 A1 Feb. 5, 2009

Related U.S. Application Data

(60) Provisional application No. 60/953,932, filed on Aug. 3, 2007, provisional application No. 60/953,333, filed on Aug. 3, 2007, provisional application No. 60/953,935, filed on Aug. 3, 2007, provisional application No. 60/953,937, filed on Aug. 3, 2007, provisional application No. 60/953,938, filed on Aug. 3, 2007, provisional application No. 60/953,963, filed on Aug. 3, 2007, provisional application No. 60/953,964, filed on Aug. 3, 2007.

(51) Int. Cl.
*G06F 17/00* (2006.01)
*G06N 5/00* (2006.01)

(52) U.S. Cl.
USPC .......................................................... 706/45

(58) Field of Classification Search
USPC ................ 706/45, 46, 47, 602, 673; 707/602, 707/673
See application file for complete search history.

(56) References Cited

U.S. PATENT DOCUMENTS

| | | | | |
|---|---|---|---|---|
| 4,760,523 | A * | 7/1988 | Yu et al. ................................. | 1/1 |
| 5,907,703 | A * | 5/1999 | Kronenberg et al. ......... | 719/321 |
| 6,356,946 | B1 | 3/2002 | Clegg et al. | |
| 7,685,327 | B1 * | 3/2010 | Jacobson et al. ................. | 710/10 |
| 2002/0178439 | A1 * | 11/2002 | Rich et al. ...................... | 717/174 |
| 2003/0018614 | A1 * | 1/2003 | Hayes et al. ...................... | 707/1 |
| 2004/0088681 | A1 * | 5/2004 | Berg et al. ...................... | 717/120 |
| 2004/0123285 | A1 * | 6/2004 | Berg et al. ...................... | 717/174 |
| 2005/0187962 | A1 * | 8/2005 | Grondin et al. ............... | 707/102 |
| 2006/0020645 | A1 * | 1/2006 | Hasegawa et al. ............ | 707/204 |
| 2006/0179087 | A1 * | 8/2006 | Fujii et al. ..................... | 707/205 |

OTHER PUBLICATIONS

"A Program Annotation Facility for the Java Programming Language", JSR-175 Public Draft Specifiation, (2002-2003), 1-34.
"Getting Started with the Annotation Processing Tool (apt)", http://java.sun.com/j2se/1.5.0/docs/guide/apt.GettingStarted.html, (2004), 1-8.
"Package—Java 2 Platform Standard Edition Version 1.4.2", http://java.sun.com/j2se/1.4.2/docs/aji/java/io/package-summary.html, (2003), 1-6.
Gosling, James, et al., "The Java Language Specification Third Edition", Addison Wesley-, (May 2005), 259-286 & 356-358.

* cited by examiner

*Primary Examiner* — Jeffrey A Gaffin
*Assistant Examiner* — Ilya Traktovenko
(74) *Attorney, Agent, or Firm* — Schwegman Lundberg & Woessner, P.A.

(57) ABSTRACT

A method and apparatus for computer file system traversal. An embodiment of a method includes obtaining a computer archive, the computer archive including one or more data elements. The computer archive is traversed, with traversing the computer archive including processing a data element of the computer archive. Processing a data element includes reading a name of the data element, and determining whether to process the first data element based on the name of the first element. If the first data element is to be processed, the data element is extracted and traversal of the first data element continues. If the data element is not to be processed, the data element is skipped. A serial data stream representing selected data elements of the computer archive is output.

15 Claims, 9 Drawing Sheets

COMPUTER ARCHIVE TRAVERSAL

RELATED APPLICATIONS

This application is related to and claims priority to U.S. provisional patent application 60/953,932, filed Aug. 3, 2007.

This application is further related to:

U.S. patent application Ser. No. 11/648,065, entitled "Computer File System Traversal", filed Dec. 30, 2006;

U.S. patent application Ser. No. 12/184,904, entitled "Computer File Processing", filed Aug. 1, 2008, claiming priority to U.S. provisional application 60/953,933, filed Aug. 3, 2007;

U.S. patent application Ser. No. 12/184,911, entitled "Annotation Processing of Computer Files", filed Aug. 1, 2008, claiming priority to U.S. provisional application 60/953,935, filed Aug. 3, 2007;

U.S. patent application Ser. No. 12/184,915, entitled "Annotation Data Filtering of Computer Files", filed Aug. 1, 2008, claiming priority to U.S. provisional application 60/953,937, filed Aug. 3, 2007;

U.S. patent application Ser. No. 12/184,924, entitled "Annotation Data Handlers for Data Stream Processing", filed Aug. 1, 2008, claiming priority to U.S. provisional application 60/953,938, filed Aug. 3, 2007;

U.S. patent application Ser. No. 12/184,932, entitled "Dependency Processing of Computer Files", filed Aug. 1, 2008, claiming priority to U.S. provisional application 60/953,963, filed Aug. 3, 2007; and U.S. patent application Ser. No. 12/184,938, entitled "Data Listeners for Type Dependency Processing", filed Aug. 1, 2008, claiming priority to U.S. provisional application 60/953,964, filed Aug. 3, 2007.

TECHNICAL FIELD

Embodiments of the invention generally relate to the field of computer systems and, more particularly, to a method and apparatus for computer archive traversal.

BACKGROUND

Computer archives contain one or more computer files, generally in a compressed form. Archive will provide a more efficient form of storage, but extracting data from an archive will require a certain amount of time. If the files within an archive require processing, then the extraction of the files may create a burden on the system, particularly if only a subset of the files will be processed. In a particular example, an archive may be a Java archive, or JAR, file. In such a structure, the intermediary nodes are inner archives contained in other archives, with the leaf nodes being non-archive file entries.

However, there may be instances in which it is necessary or useful to address the contents of the archive as a stream of data. In one example, a serial process may be in place for evaluation of the data within the archive.

The extraction of the archive and conversion into a data stream for processing may be time consuming. In particular, there may be numerous files that do not require processing, and thus extraction of such files is unnecessary. In order to efficiently process the process the contents of the archive, the archive requires effective handling to address the appropriate elements with minimal wasted operations.

SUMMARY OF THE INVENTION

A method and apparatus are provided for computer archive traversal.

In a first aspect of the invention, an embodiment of a method includes obtaining a computer archive, the computer archive including one or more data elements. The computer archive is traversed, with traversing the computer archive including processing a data element of the computer archive. Processing a data element includes reading a name of the data element, and determining whether to process the first data element based on the name of the first element. If the first data element is to be processed, the data element is extracted and traversal of the first data element continues. If the data element is not to be processed, the data element is skipped. A serial data stream representing selected data elements of the computer archive is output.

In a second aspect of the invention, an embodiment of an archive traversal system includes a walker module to traverse a computer archive, with the computer archive including one or more data elements. System also includes a handler module to determine whether to process or skip each data element of the computer archive and to output a serial data stream representing selected nodes of the computer archive, and a file classification module to classify the data elements of the computer archive.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to computer archive traversal.

As used herein:

"Traversal" means a process for progressing through the elements of a computer system, including a process for progressing through the elements of a computer archive.

"Archive" means a single file that may contain one or more separate files. An archive may also be empty. The files within an archive are extracted, or separated, from the archive for use by a computer program. The files contained within an archive are commonly compressed, and the compressed files are decompressed prior to use. An archive may further include data required to extract the files from the archive. "Archive" may also refer to act of transferring one or more files into an archive.

"Compression" means the conversion of data into a form that requires less storage space. The term "compression" includes the use of any known compression algorithm. "Compression" also may commonly be referred to as "zipping" a file. The reverse process to compression is decompression, or expansion, of the compressed data back into a usable form. Compressed data is decompressed (expanded or unzipped) prior to use. Compression includes both lossy compression, in which data is lost in the process of compression, or lossless compression, in which no data is lost in the process of compression.

In an embodiment of the invention, an efficient archive traversal process is provided for a computer archive. In an embodiment, the archive traversal converts the data of the archive elements into a serial data stream.

In an embodiment of the invention, an archive traversal walks through the elements of the archive in a single pass, with each element being processed no more than once. In an embodiment, the traversal is conducted without any need for looking ahead in the archive. The resulting data stream may be provided to a module for processing.

In an embodiment of the invention, an archive traversal process may be included within a set of tools to search files. In an embodiment, the traversal may be a part of a combined processing pipeline for file navigation, including the archive traversal, and file processing, including class file data extraction. In an embodiment, an archive traversal process may work in conjunction with a file structure traversal process such that the archive traversal is used if an archive is encountered in the traversal of a hierarchical file structure.

In one example, an archive includes a Java archive (or JAR file). A Java archive consolidates multiple files into a single archive file, which contain Java classes and other auxiliary files, such as properties files. A Java archive utilizes the ZIP file format based on the original PKZip utility, which provides lossless data compression and archiving. The archival and compression of class files allows for more efficient storage and distribution, but the files require extraction and decompression in order to be utilized. In an embodiment of the invention, an archival traversal system provides for efficient processing of a JAR file. Other types of archive formats may include WAR (Web Application aRchive) files, which are Java archives that store XML files, java classes, Java Server Pages, and other objects for Web Applications; EAR (Enterprise ARchive) files, Java archives that store XML files, java classes and other objects for enterprise applications; and RAR (Resource Adapter aRchive) files, Java archives that store XML files, java classes and other objects for J2EE Connector Architecture (JCA) applications.

In general, an archive may include both files and archives (which may be referred to as inner archives). In an embodiment of the invention, the traversal of an archive includes the traversal of one or more inner archives within the archives.

An archive may be an element in a file structure. In an embodiment of the invention, a traversal of an archive may be called during the traversal of a file structure, which may process the archive and return to the traversal of the remaining file structure. For example, a traversal of a file system may include the traversal of a hierarchical file structure as described in patent application Ser. No. 11/648,065, entitled "Computer File System Traversal", filed Dec. 30, 2006.

In an embodiment, processing of an archive is provided in a single pass, without processing any element more than once. The traversal process provides basic filtering and decision making without looking forward in the archive. In an embodiment, the traversal operates on an archive with named nodes such that decision making can be based upon the node names.

In an embodiment, an initial step involves the determination whether a set of data elements is in the form of an archive. If not, as in, for example, if the set of data elements is in the form of an hierarchical data structure, the set of data elements may directed to other processing. If the data elements are in the form of a computer archive, the archive traversal may proceed. In an embodiment of the invention, the output of a computer archive traversal is one or more classes of interests, or all classes contained within the archive.

In an embodiment of the invention, the archive traversal will examine each element that is reached in the traverse. Based on the name of the element, the process will either continue processing or skip. In this manner, the process is not required to enter, and thus extract, an element that is not of interest and then back out of the element—each element will either be processed or skipped. In an embodiment, an element may be either a file or another archive (inner archive) within the archive. In such instance, the inner archive is then subjected to processing in the same form as the processing of the original, or outer, archive.

In an embodiment, traversal of an archive is recursive, and is implemented based upon the archive framework, with the traversal code or system not being required to view a file except for the relevant name sequence. In this embodiment, the basic decision making is based only on the file names. In an embodiment, there are three main cooperating abstractions applied in the process:

(1) Traversal orchestration by a "walker" element.

(2) Node processing by a "walker handler" element, including filter handlers to provide traversal control and processing handlers to process traversal lead nodes.

(3) File classification, with a name-based, extension-based being sufficient in most cases.

In a particular embodiment of the invention, a process is applied to class files contained within a Java archive (or JAR file), including class files for J2EE systems (Java 2, Enterprise Edition). In an embodiment, the output of the archive traversal is a class file stream. In particular, an embodiment utilizes Java under the JDK (Java Development Kit) 5.0, including the JSR-175 recommendation regarding code annotations.

In an embodiment of the invention, events and handler invocations are utilized in implementing archive traversal. Handler codes may be provided for the action of processing or skipping the current element, and to stop processing overall or to stop processing of the current element. In an embodiment of the invention, a library for a traversal process may include, but is not limited to:

(a) An archive walker (which may be referred to herein as a ZipWalker);

(b) A classifier for typical Java files;

(c) A configurable archive search with file based conditions (using regular expressions on file names and file classifier classes) and conditions for traversal of particular nodes.

In an embodiment, the archive traversal will further provide a mechanism for aborting the archive traversal if needed, and for ending the traverse upon completion. On abort, the system will clean up any data issues remaining from the traversal process. On end, the system will store the data that is gained from the traversal process.

Figure 1A:
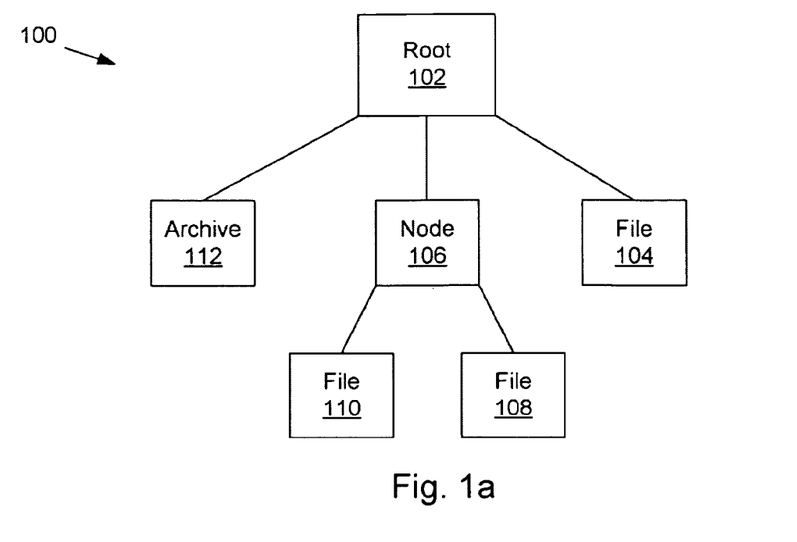
FIG. 1a is an illustration of a file hierarchy including an archive that may be processed in an embodiment of the invention.

FIG. 1a is an illustration of a file hierarchy including an archive that may be processed in an embodiment of the invention. In this illustration, a hierarchical file system 100 may include a root node 102, with the root node 102 having one or more branches below in the hierarchy. For example, a branch may include a file 104, which would be a "leaf node" as it terminates the branch. In another example, the branch 106 may include one or more nodes below, which in this case are shown as file 108 and file 110. These elements are leaf nodes in this example, but other branches may exist below in the hierarchy.

In addition, a branch may be an archive 112, the archive containing one or more files (unless the archive is empty). The file hierarchy 100 may include any number of archives, with the archives existing at any point in the hierarchy. In an embodiment of the invention, the file hierarchy may be subject to processing for a file system. In an embodiment, the operation may be transferred to a separate processing to address the computer archive when it is encountered. In an embodiment, after completion of processing of the archive the operation may return to the original processing.

Figure 1B:
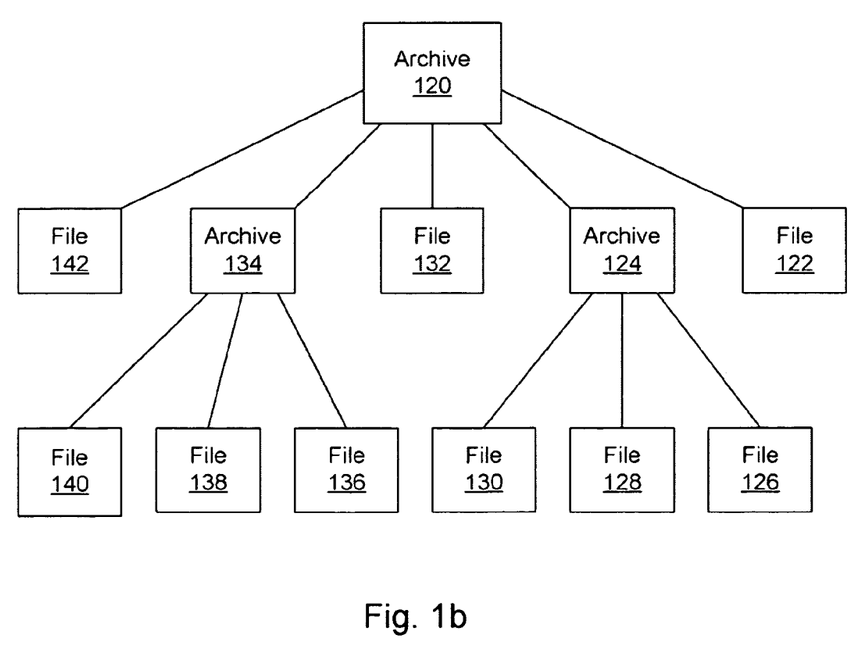
FIG. 1b is a illustration of an archive that may be processed in an embodiment of the invention.

FIG. 1b is an illustration of an archive that may be processed in an embodiment of the invention. The archive 120 may, in one example, be an archive encountered in the processing of a file system, such as archive 112 in the processing of the hierarchical file system 100. A non-empty archive will contain one or more files or archives (each such archive being an archive within an archive, or an inner archive). In this illustration, archive 120 contains file 122, file 132, and file 142, but also contains inner archive 124 and inner archive 134. Archive 124 contains one or more files or archives, which are shown here as file 126, file 128, and file 130. Archive 134 contains one or more files or archives, which are shown here as file 136, file 138, and file 140.

In an embodiment of the invention, the contents of archive 120 are traversed, with the outcome of the traversal of the archive being a data stream representing selected portions of such contents. In an embodiment of the invention, the traversal addresses each element of the archive no more than once. In an embodiment of the invention, the selection of elements to process is based upon the names of the elements, thus preventing the need to enter archived elements, such as to decompress such elements, if the elements will not be processed.

Figure 2:
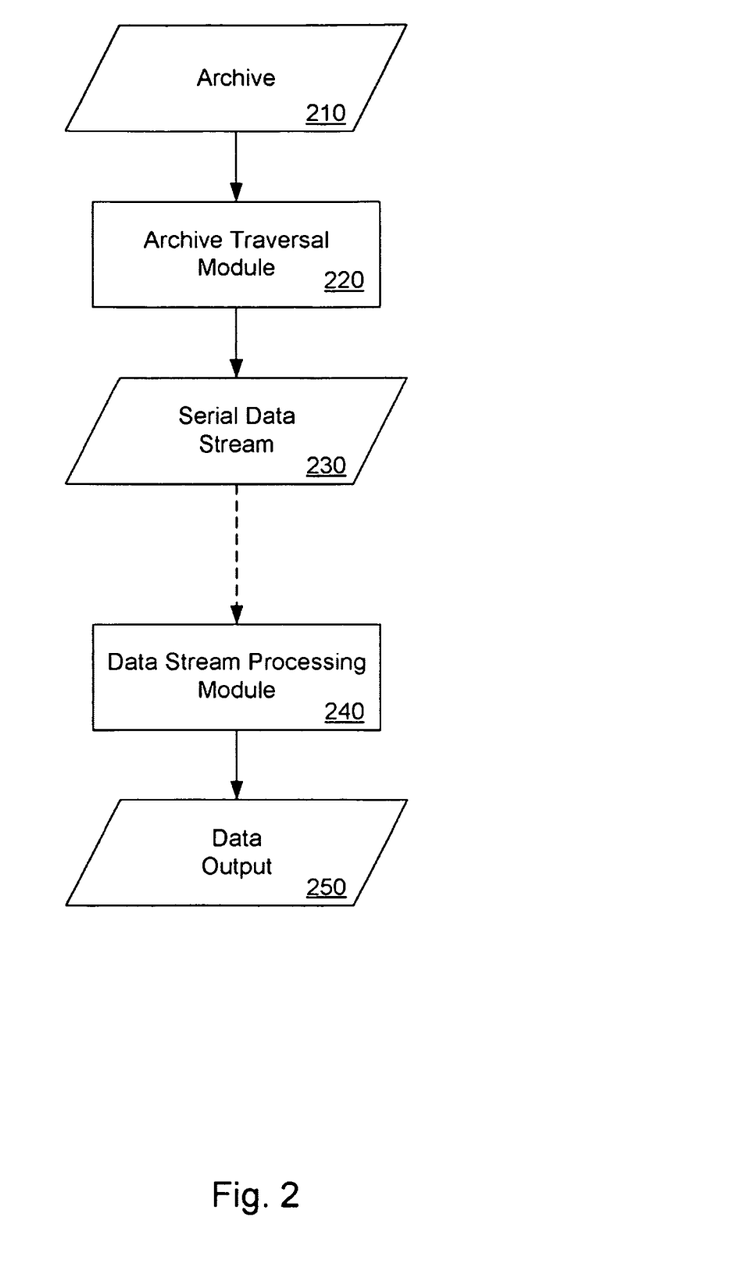
FIG. 2 is an illustration of an embodiment of a computer archive traversal process.

FIG. 2 is an illustration of an embodiment of a file traversal process. In this illustration, a computer archive 210 is provided to an archive traversal module 220. The archive 210 may include, but is not limited to, a Java archive, or JAR file. The contents of the archive 210 may include one or more files and/or archives. The file system may include certain elements that may be sought, including, but not limited to annotations for Java files.

In an embodiment of the invention, the archive traversal module 220 walks through the archive structure. Using only the names of the elements, the archive traversal module 220 makes a determination whether to process or skip each element of the archive. In an embodiment of the invention, the archive traversal module processes only portions of interest, and does not process any element more than once.

In an embodiment of the invention, the archive traversal module 220 then outputs a serial data stream 230 representing the elements of interest in the archive 210. In an embodiment, the data stream 230 may be used for any purpose, including the provision of the data to a data stream processing module 240. The processing module 240 may be intended to process the archive in a serial form to, for example, search for certain elements in the portions of interest in the archive. The processing module 240 may then produce a data output 250 that, for example, includes information regarding elements that were found in the archive.

Figure 3:
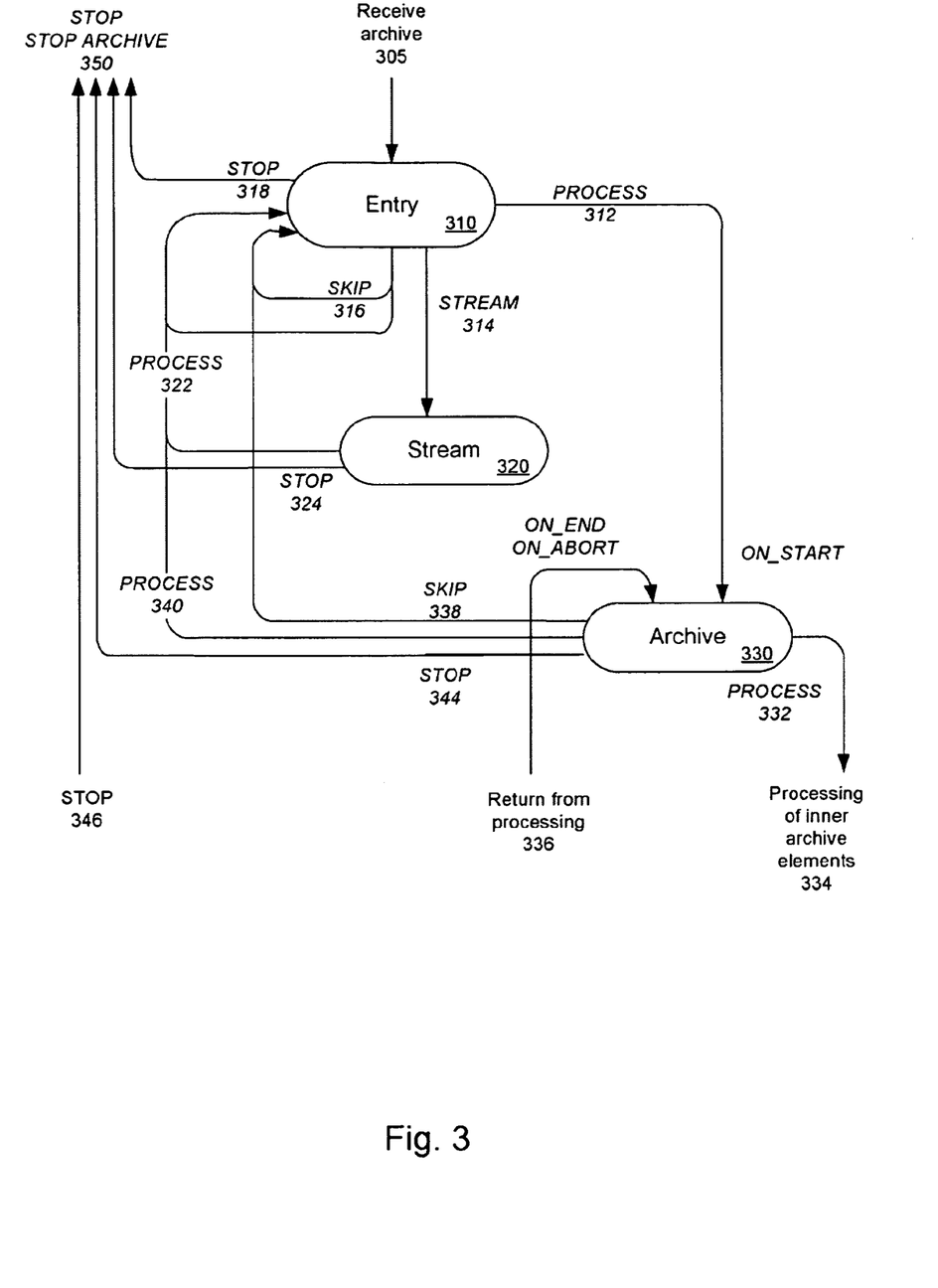
FIG. 3 is an illustration of an embodiment of process for traversal of archive entries.

FIG. 3 is an illustration of an embodiment of process for traversal of individual file entries of an archive. FIG. 3 illustrates a process to be utilized for any particular entry in an archive. In this illustration, an archive is received, and an entry is addressed 310. Based on the name of the archive element, the element is either processed 312 or skipped 316. If there is a skip 316, then there is a return to the next element 310, and if there are no more elements to process there is a stop 318. If there is an element to process the element is either a file or an archive within the archive. If the element is a file, there is a determination to stream 314 the data of the file to create a data stream 320. There may then be a continuation of processing 322 or a stop 324.

If the element is an inner archive, there is a determination to process 312 the inner archive 330. Upon addressing the inner archive, there may be a determination to process 332 or skip 338 the elements of the archive. If there is a determination to skip 338, the elements of the inner archive 330, there is a return to the next entry 310 of the outer archive. If there is a determination to process 332 an element of the inner archive, the processing 334 occurs in a similar manner as the processing of the outer archive. Upon completion or abort of the processing of the inner archive element there is a return from processing 336, or there may be a stop 346 if required. Upon returning, the next element of the inner archive 330, if any, may then be addressed. When all elements of the inner archive 330 have been addressed, there is a return to processing 340 to the next entry 310 of the outer archive.

Figure 4:
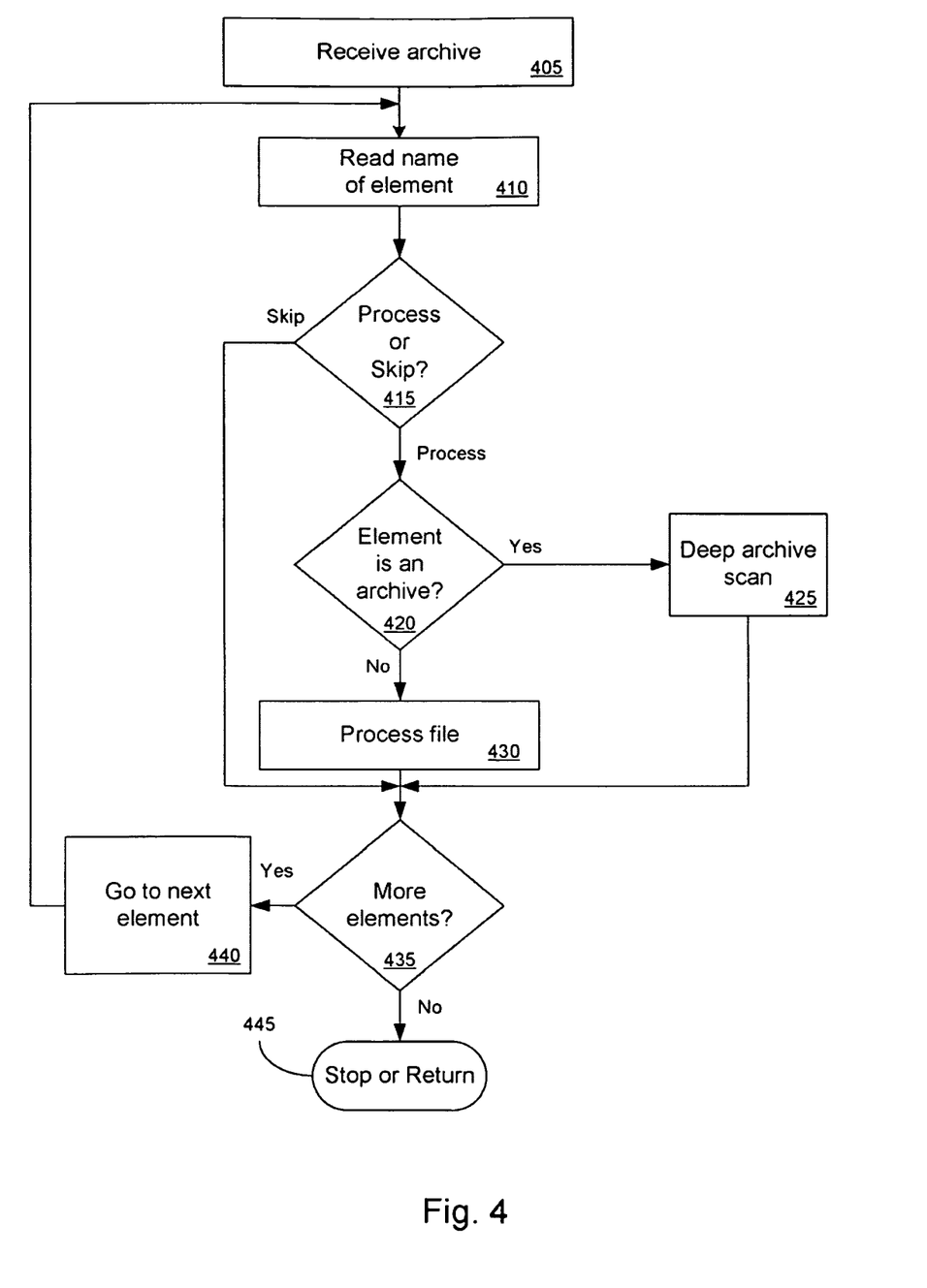
FIG. 4 is a flowchart to illustrate an embodiment of a computer archive traversal.

FIG. 4 is a flowchart to illustrate an embodiment of an archive traversal. In this illustration, an archive is received 405, the archive including one or more elements, including one or more files and/or archives. The name of the first element is read 410. Based on the name of the element, there is a determination whether to process or skip the element 415. If the determination is to process, there is a determination whether the element is an archive 420. If so, then the elements of the archive are processed, which may be referred to as a deep archive scan 425. The deep archive scan may be the equivalent of processing the elements of the inner archive in the same manner as the elements of the original, or outer, archive are processed. If the element is not an archive, then the element is a file, and the file is processed 430. After the processing of the file 430 or the deep archive scan 425 there is a determination whether there are any more elements in the archive 435. If so, then the traversal continues to the next element 440 and the process returns to reading the name of the element 410. If there are no elements, then there is a stop or a return 440 (the return occurring, for example, if the archive is traversed during a traversal of a hierarchical file structure). For clarity of explanation, the illustration shown in FIG. 4 does not illustrate every possible operation. For example, the processing of an archive may result in an abort directive at any point in the process.

Figure 5:
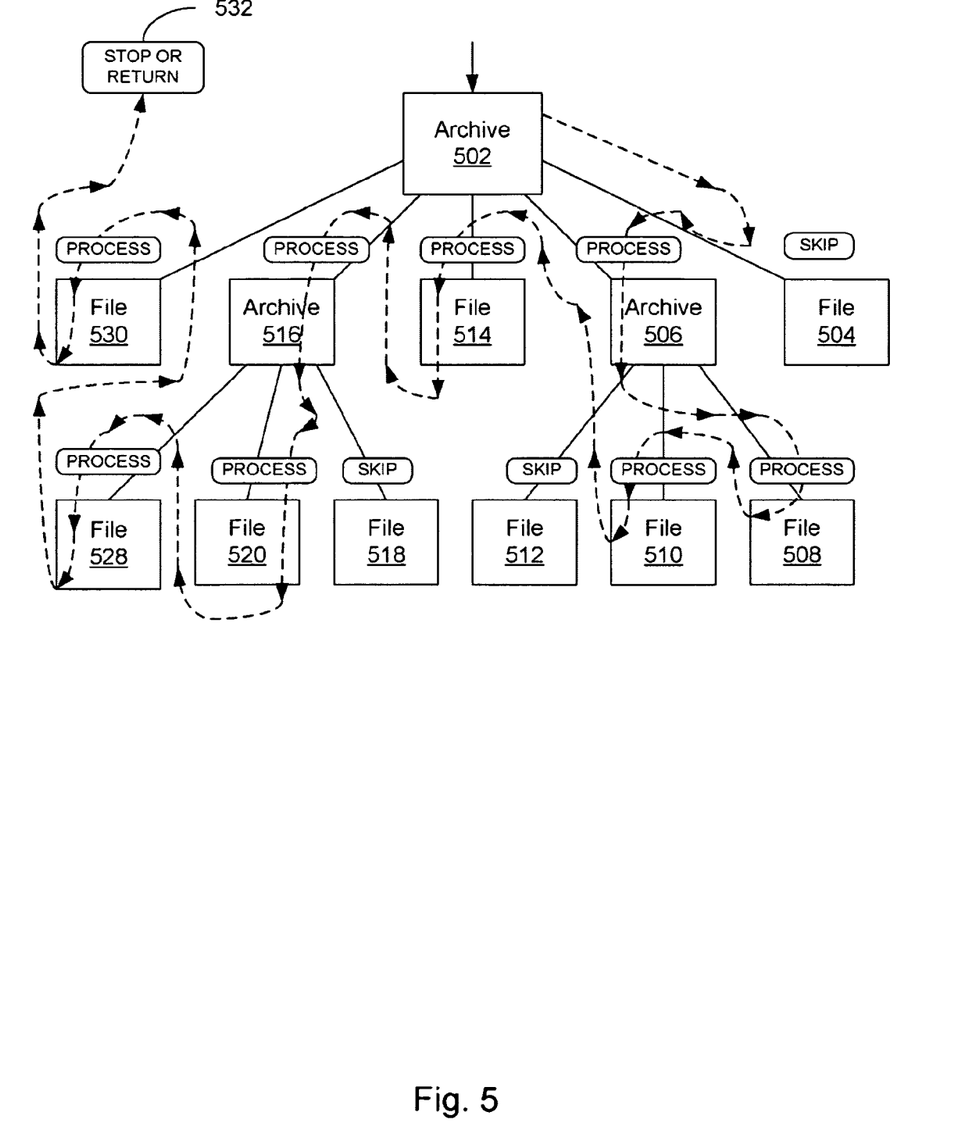
FIG. 5 is an illustration of the traversal of an exemplary computer archive using an embodiment of the invention.

FIG. 5 is an illustration of the traversal of an exemplary computer archive using an embodiment of the invention. In this illustration, the processing of an archive includes the traversal of multiple elements contained with the archive, the elements being either files or archives within the archive. As shown in FIG. 5, the archive 502 includes multiple elements. At each element, the name of the element is read and, based on the name of the element, the element is either processed or skipped. In this process, if an inner archive within the archive is reached, then the elements within the inner archive may be processed in the same manner.

In one example, the process may begin with the first element, file 504. Based on the name, file 504 is skipped, and thus file 504 does not require decompression if the file is currently compressed. The process continues to next element, inner archive 506. Based on the name, there is a determination to process inner archive 506. Archive 506 includes file 508, file 510, and file 512. The process continues with the archive elements, such are processing file 508, processing file 510, and skipping file 512.

The next element is file 514, and, based on the file name, the file is processed. The traversal then continues to a second inner archive 516, and, based on the archive name, the archive is processed. In this example archive 516 includes file 518, file 520, and file 528. The traversal may include skipping file 518, processing file 520, and processing 528. The traversal then will return to the next element, file 530 in this example, which, based on the file name, is processed. This concludes the traversal of the archive 502, and the process either stops or returns 532, such as a return to processing of a hierarchical file structure if archive 532 is an element of the file structure.

In an embodiment of the invention, the traversal of the archive 502 results in a data stream representing the contents of the archive. In an embodiment of the invention, no element of the archive is addressed more than once. In an embodiment, the files within the archive are only decompressed if there is a determination to process the file.

Figure 6:
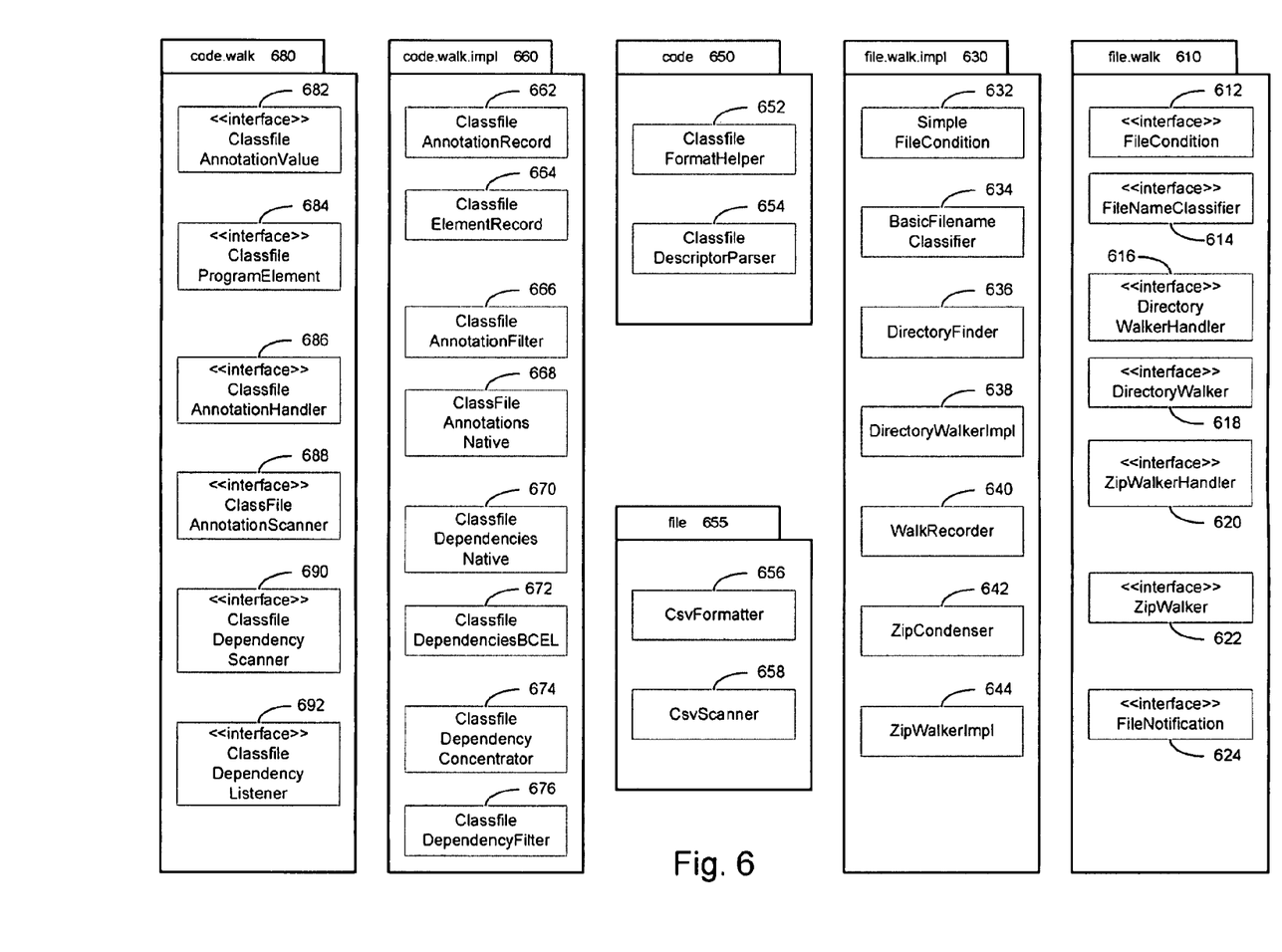
FIG. 6 is an embodiment of utilities for traversing computer archives.

FIG. 6 is an embodiment of library utilities, including utilities for traversing computer archives. FIG. 6 may illustrate software modules, hardware modules, or modules including a combination of software and hardware. In this illustration, the utilities relate to an interface layer comprising code walk interfaces (code.walk 680) for class file processing and file walk interfaces (file.walk 610) for locating files; and further to an implementation toolbox comprising code processing 650 and a code walk implementation (code.walk.impl 660) for class file processing, and file processing 655 and a file walk implementation (file.walk.impl 630) for locating files.

In the interface layer, the code walk interfaces 680 may include a class file annotation value interface module 682, a class file program element interface module 684, a class file annotation handler interface module 686, a class file annotation scanner interface module 688, a class file dependency scanner interface module 690, and a class file dependency listener interface module 692. The file walk interfaces then may include a file condition interface module 612, a file name classifier interface module 614, a directory walker handler interface module 616, a directory walker interface module 618, a zip walker handler interface module ("zip" indicating use for archives) 620, a zip walker interface module 622, and a file notification interface module 624.

In an embodiment of the invention, the code processing 650 may provide for parsing types from class file descriptors. Code processing 650 may include a class file format helper module 652 and a class file descriptor parser module. The code walk implementation 660 for class file processing may include a class file annotation record module 662, a class file element record module 664, a class file annotation filter 666, a class file annotation for native elements 668, a class file dependencies module for native elements 670, a class file dependencies module for BCEL (Byte Code Engineering Library) elements 672, a class file dependency concentrator module 674, and a class file dependency filter 676.

In an embodiment of the invention, the file processing 655 may include a comma separated value (CSV) formatter and a CSV scanner. The file walk implementation 630 for locating files may include a simple file condition module 632, a basic file name classifier module 634, a directory finder module 636, a directory walker implementation module 638, a walk recorder module 640, a zip (archive) condenser module 642, and a zip walker implementation module 644.

Figure 7:
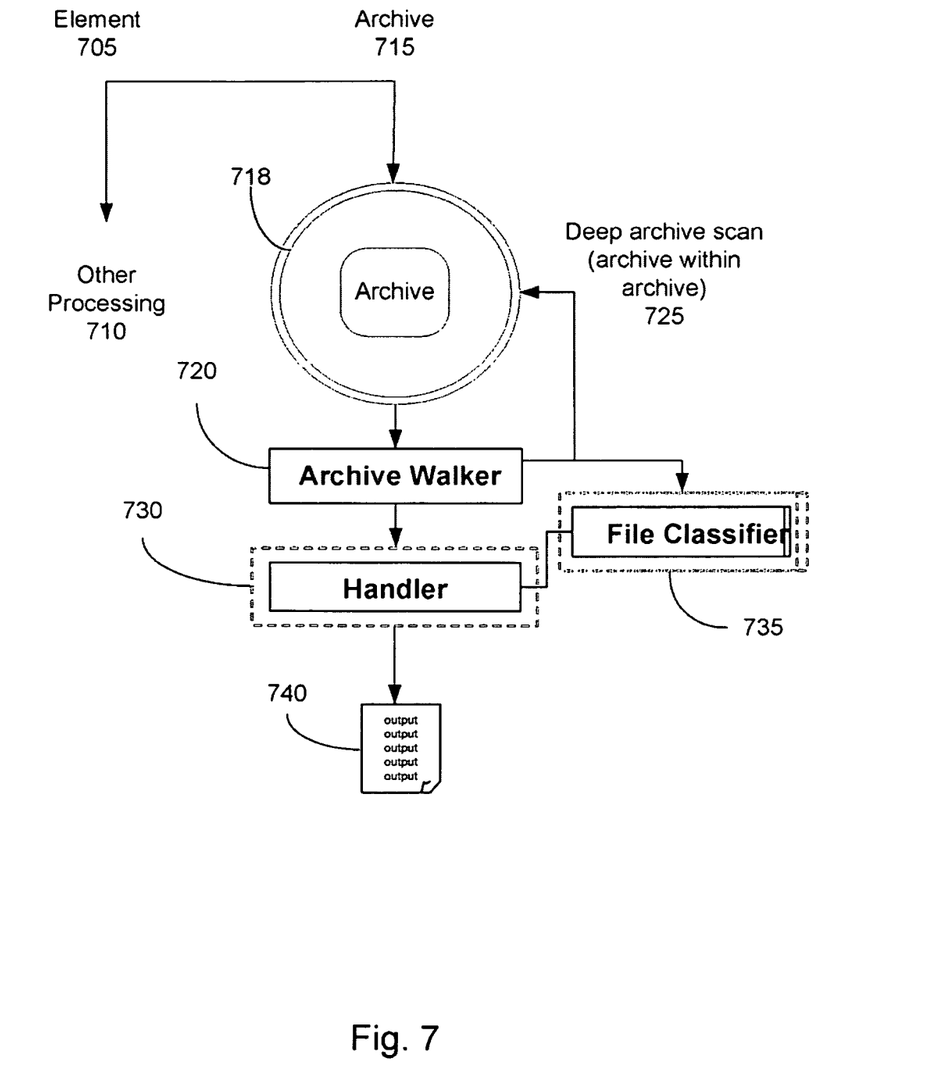
FIG. 7 is an illustration of a system for traversal of computer archives.

FIG. 7 is an illustration of a system for traversal of a Java archive. In this particular embodiment, a Java class file element 705 is received for processing. If the element is not an archive, such as in cases in which the element is a non-archive node of a hierarchical file structure, the element is directed to other processing. If the element is an archive 715, the archive is examined 718. In an embodiment, an archive walker module 720 provides an interface for walking over the archive. The archive walker module 720 operates with an archive handler module 730 that controls the behavior of the archive traversal. The archive handler 730 works with a file classifier 735 to classify the elements identified in the archive traversal. If an element of the archive 715 is another archive (an inner archive), the traversal proceeds with a deep archive scan 725.

The traversal of the Java archive 715 results in a class file data stream 740. The class file data stream 740 may be an output in itself, or may be an input for further processing of the class files in a serial format.

Figure 8:
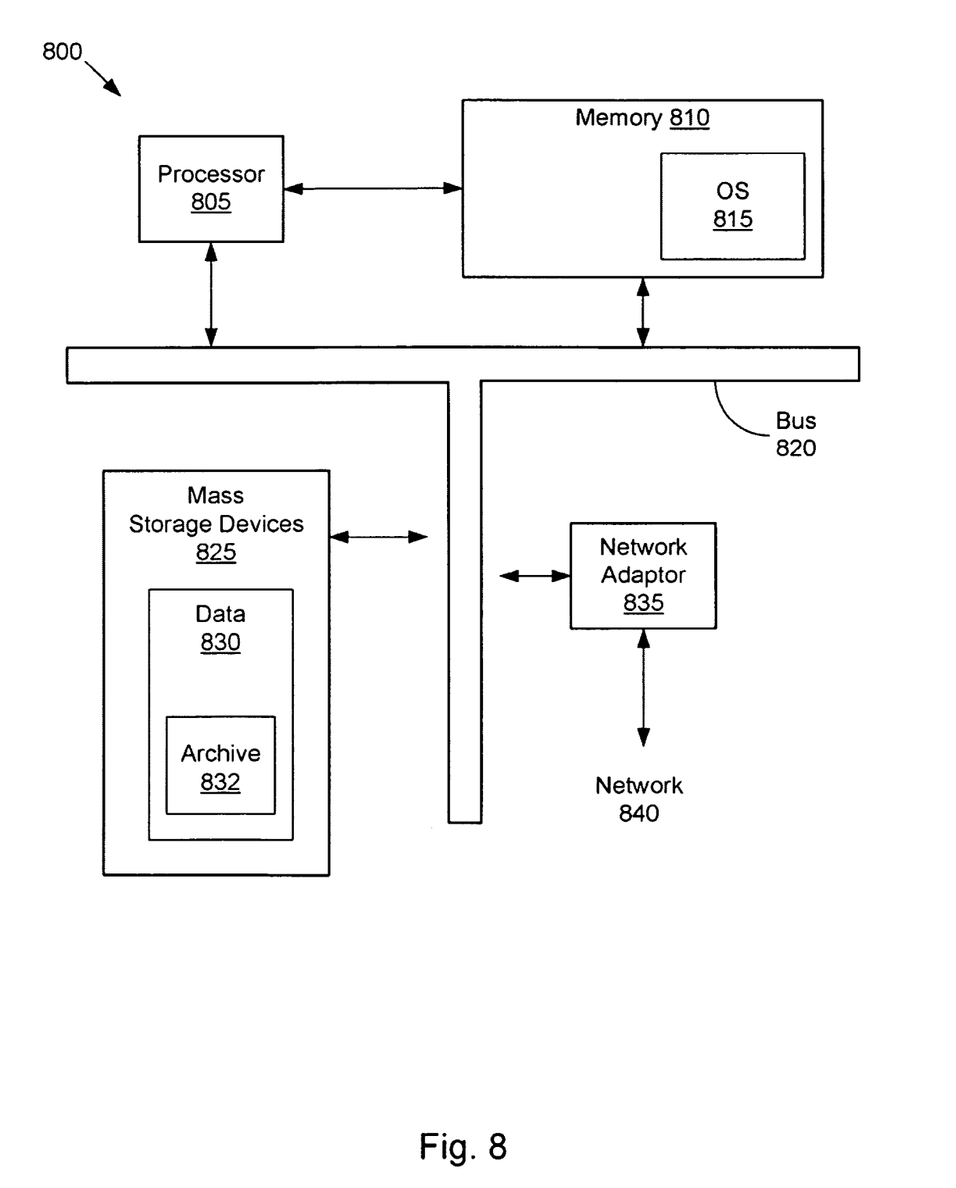
FIG. 8 is an illustration of a computer system in an embodiment of the invention.

FIG. 8 is an illustration of a computer system in an embodiment of the invention. A computer system may include a system for processing of an archive. The computing system illustrated in FIG. 8 is only one of various possible computing system architectures, and is a simplified illustration that does include many well-known elements. As illustrated, a computing system 800 can execute program code stored by an article of manufacture. Computer system 800 may be a J2EE system, ABAP system, or administration system. A computer system 800 includes one or more processors 805 and memory 810 coupled to a bus system 820. The bus system 820 is an abstraction that represents any one or more separate physical buses, point-to-point connections, or both connected by appropriate bridges, adapters, or controllers. The bus system 820 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements thereto)

As illustrated in FIG. 8, the processors 805 are central processing units (CPUs) of the computer system 800 and control the overall operation of the computer system 800. The processors 805 execute software stored in memory 810. A processor 805 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 810 is or includes the main memory of the computer system 800. Memory 810 represents any form of random access memory (RAM), read-only memory (ROM), flash memory, or the like, or a combination of such devices. Memory 810 stores, among other things, the operating system 815 of the computer system 800.

Also connected to the processors 805 through the bus system 820 are one or more internal mass storage devices 825 and a network adapter 835. Internal mass storage devices 825 may be or may include any conventional medium for storing large volumes of instructions and data 830 in a non-volatile manner, such as one or more magnetic or optical based disks. In an embodiment of the invention, the mass storage devices may include storage of an archive 832 that requires processing. In an embodiment of the invention, the processors 805 operate to traverse the archive 832, the traversal of the archive 832 resulting in output of a serial data stream representing selected elements of the archive.

The network adapter 835 provides the computer system 800 with the ability to communicate with remote devices, over a network 840 and may be, for example, an Ethernet adapter. In one embodiment, the network adapter may be utilized to output data including, for example, the serial data stream representing selected elements of the archive 832, the data stream being output for further processing of the data stream on another system.

Figure 9:
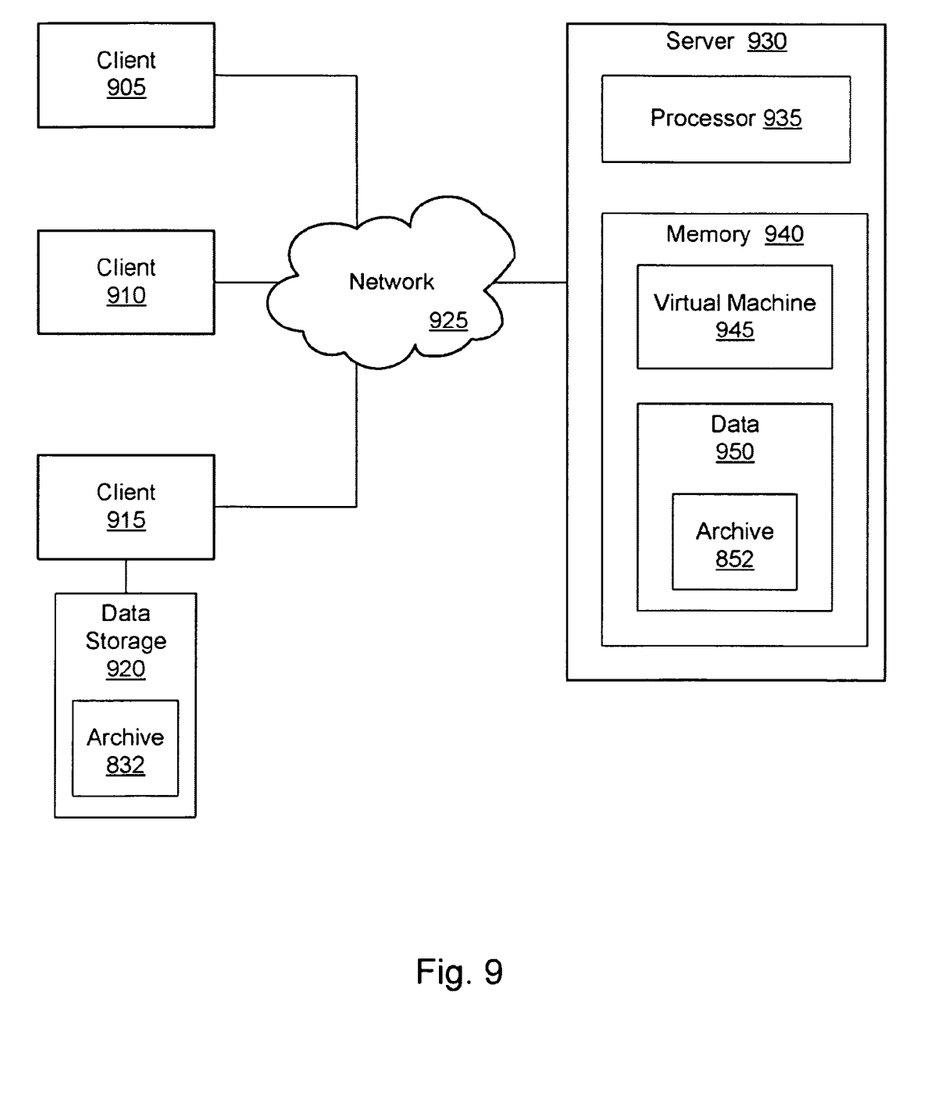
FIG. 9 is an illustration of an embodiment of a client-server network system.

FIG. 9 illustrates an embodiment of a client-server network system. As illustrated, a network 925 links a server 930 with client systems 905, 910, and 915. Client 915 may include certain data storage 920, including, for example, a computer archive 922. Server 930 includes programming data processing system suitable for implementing apparatus, programs, and/or methods in accordance with one or more embodiments of the present invention. Server 930 includes processor 935 and memory 940. Server 930 provides a core operating environment for one or more runtime systems, including, for example, virtual machine 945, at memory 940 to process user requests. Memory 940 may include a shared memory area that is accessible by multiple operating system processes executing in server 930. For example, virtual machine 945 may include an enterprise server (e.g., a J2EE-compatible server or node, Web Application Server developed by SAP AG, WebSphere Application Server developed by IBM Corp. of Armonk, N.Y., and the like). Memory 940 can be used to store an operating system, a Transmission Control Protocol/Internet Protocol (TCP/IP) stack for communicating over network 925, and machine executable instructions executed by processor 935. The memory 945 may also include data 950 for processing, including the processing of data that includes data of one or more computer archives 952. In some embodiments, server 935 may include multiple processors, each of which can be used to execute machine executable instructions.

Client systems 905-915 may execute multiple application or application interfaces. Each instance or application or application interface may constitute a user session. Each user session may generate one or more requests to be processed by server 930. The requests may include instructions or code to be executed on a runtime system, such as virtual machine 945 on server 930.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
    obtaining a computer archive, the computer archive including a plurality of data elements, each of the data elements comprising one of a computer file and another computer archive;
    traversing the computer archive, the traversing of the computer archive including, for each one of the data elements:
        determining, using at least one processor, whether to process the one of the data elements based on a name of the one of the data elements,
        determining whether the one of the data elements is a computer file or another computer archive based on a determination that the one of the data elements is to be processed,
        extracting, based on a determination that the one of the data elements is a computer file, the computer file,
        traversing, based on a determination that the one of the data elements is another computer archive, the other computer archive completely prior to proceeding to a next one of the plurality of data elements of the computer archive, and
        skipping the one of the data elements based on a determination that the one of the data elements is not to be processed; and
    outputting a serial data stream representing the extracted computer files of the computer archive.

2. The method of claim 1, wherein the one of the data elements is compressed, and wherein the extracting of the one of the data elements includes decompressing the one of the data elements.

3. The method of claim 1, further comprising:
determining whether the plurality of data elements is in the form of a computer archive, the obtaining of the computer archive being in response to a determination that the plurality of data elements is in the form of a computer archive.

4. The method of claim 1, wherein the computer archive is an element of a hierarchical file structure, and further comprising returning to processing of the hierarchical file structure upon completion of the traversal of the computer archive.

5. The method of claim 1, wherein the traversal of the computer archive includes processing each data element of the computer archive no more than once.

6. The method of claim 5, wherein the traversal of the computer archive includes processing each data element in the computer archive as it is reached without looking forward in the computer archive.

7. The method of claim 1, where the computer archive comprises a Java archive.

8. The method of claim 1, further comprising providing the serial data stream to a processing module to search the serial data stream.

9. An archive traversal system comprising:
at least one processor; and
modules comprising instructions to be executed by the at least one processor, the modules comprising:
a walker module to traverse a computer archive, the computer archive including a plurality of data elements, each of the data elements comprising a computer file or another computer archive;
a file classification module to classify each of the data elements of the computer archive as a computer file or another computer archive based on a name of that data element; and
a handler module to:
determine whether to process or skip each data element of the computer archive based on the classification of that data element,
to extract a data element to be processed based on that data element being a computer file,
to cause the walker module to traverse a data element to be processed based on that data element being another computer archive, the walker module to traverse the other computer archive completely prior to the handler module proceeding to a next one of the plurality of data elements of the computer archive, and
to output a serial data stream representing the extracted computer files of the computer archive.

10. The system of claim 9, wherein the walker module traverses the computer archive structure without addressing any data element more than once.

11. The system of claim 9, wherein the handler module processes or skips each data element of the computer archive without looking forward in the computer archive.

12. The system of claim 9, wherein the computer archive comprises a Java archive.

13. An article of manufacture comprising:
a non-transitory computer-accessible medium including instructions that, when executed by at least one processor of a machine, cause the machine to perform operations comprising:
obtaining a computer archive, the computer archive including a plurality of data elements, each of the data elements comprising one of a computer file and another computer archive;
traversing the computer archive, the traversing of the computer archive including, for each one of the data elements:
determining whether to process the one of the data elements based on a name of the one of the data elements,
determining whether the one of the data elements is a computer file or another computer archive based on a determination that the one of the data elements is to be processed,
extracting, based on a determination that the one of the data elements a computer file, the computer file,
traversing, based on a determination that the one of the data elements is another computer archive, the other computer archive completely prior to proceeding to a next one of the plurality of data elements of the computer archive, and
skipping the one of the data elements based on a determination that the one of the data elements is not to be processed; and
outputting a serial data stream representing the extracted computer files of the computer archive.

14. The article of manufacture of claim 13, wherein the operations further comprise:
determining whether the plurality of data elements is in the form of a computer archive, the obtaining of the computer archive being in response to a determination that the plurality of data elements is in the form of a computer archive.

15. The article of manufacture of claim 13, wherein the computer archive is an element of a hierarchical file structure, and wherein the operations further comprise returning to processing of the hierarchical file structure upon completion of the traversal of the computer archive.

* * * * *